United States Patent Office 3,337,666
Patented Aug. 22, 1967

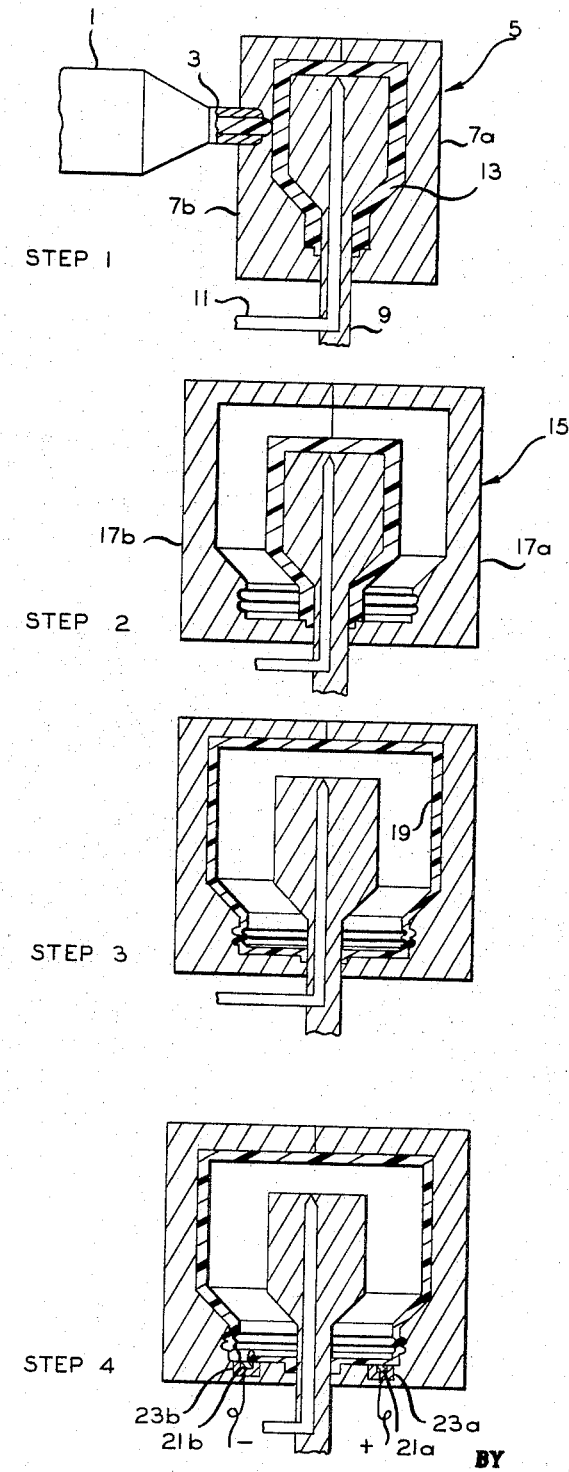

3,337,666
METHOD OF BLOW MOLDING ORIENTED CONTAINERS
Paul E. Wilkins, Bartlesville, Okla., assignor to Phillips Petroleum Company, a corporation of Delaware
Filed Jan. 4, 1965, Ser. No. 423,210
2 Claims. (Cl. 264—97)

This invention relates to plastic containers and the fabrication thereof.

In the fabrication of plastic containers, generally, a blow molding technique is employed wherein a parison of molten plastic is formed, positioned in a mold cavity and expanded therein to form the containers. The expansion of the parison causes thinning of the plastic with the farthermost points, such as corners and edges, being the thinnest resulting in non-uniform wall thickness of the container. The thin portions of the container are weak areas and have low strength which limits the utility of the container for many applications. Various modifications of the blow molding technique have been made; such as forming the parison of varying thicknesses temperature grading the parison, and the like; in attempts to overcome the problem of thinning and improving the strength of the containers. The expansion of the parison during blow molding orients the molecules of plastic imparting increased strength to the plastic. In this regard, it is known that the greatest orientation of the plastic is obtained when the parison is expanded while in the crystalline state at a temperature between the crystalline melt point and the crystalline freeze point. The crystalline freezing point is the temperature at which maximum crystalline formation occurs upon cooling of molten polymer and crystalline melting point is the temperature at which evidence of crystallinity disappears upon heating a sample of polymer from a cooled crystalline condition. Ordinarily the latter temperature is several degrees above the crystalline freezing point. The crystalline freezing point of these polymers can be determined by melting a sample of the polymer, inserting a thermocouple in the molten polymer and allowing the polymer to cool slowly. The temperature is recorded and plotted on a chart versus time. The crystalline freezing point is the first plateau in the time-versus-temperature curve. For polyethylene having a density of about 0.960 the crystalline freezing point is about 252° F. The crystalline melting point of these polymers can be determined by heating a small piece of plastic (usually film) under crossed polaroids in a microscope equipped with means for heating the polymer. The specimen is heated slowly and the melting point is the temperature at which birefringence disappears. For polyethylene having a density of about 0.960 the crystalline melting point is ordinarily about 272° F. For maximum orientation, it is desirable to cool the material below the crystalline freeze point and then reheat it to the proper orienting temperature.

It is an object of this invention to provide blow molded plastic containers having uniform wall thickness and strength.

It is another object of this invention to provide blow molded plastic containers having an open neck portion which is oriented to the same degree as the remainder of the container.

It is still another object of this invention to provide an improved method for blow molding plastic containers.

A further object of this invention is to provide improvements in the formation of parisons for use in blow molding operations.

Other objects, advantages and features of this invention will be apparent to one upon further study of this disclosure, the drawing and appended claims.

In accordance with this invention, a container having uniform wall thickness is formed by first forming a parison of molten plastic into a shape having a configuration similar to that of the desired container. The parison thus formed is then expanded in a mold to obtain the container. Preferably, the parison is formed into the desired shape about a mandrel having similar configuration to that of the container. The parison as formed about the mandrel is of uniform wall thickness. The uniform thickness of the parison permits even heating and cooling of the entire parison within the same period of time, thus permitting uniform heating and cooling of the entire parison and eliminating delays in subsequent operations by the necessity of heating or cooling the thicker minor portions of the parison.

This invention will now be described in more detail with reference to the accompanying drawing showing stepwise operation wherein:

Step 1 is a sectional view of an injection mold with a parison formed about a mandrel therein;

Step 2 is a sectional view of the parison formed about the mandrel in Step 1 positioned in a blow mold;

Step 3 is a sectional view of the parison expanded from the mandrel into the shape of the blow mold cavity; and Step 4 is a sectional view like Step 3 but showing means for removing the plastic formed across the opening of the container.

Referring now to the drawing; in Step 1, injection mold 5 which comprises half sections, 7a and 7b, is in closed position about mandrel 9 having a conduit 11 disposed therein for the introduction of fluid under pressure. Mandrel 9 and the cavity of mold 5 have configurations similar to that of the container to be formed and as positioned together define cavity 13 of uniform thickness. Plastic material made molten in cylinder 1, partially shown, is injected into cavity 13 through nozzle 3 communicating with cylinder 1 through mold half 7b. After the parison is formed about the mandrel, for maximum orientation it is desirable to cool the parison on the mandrel to below the crystalline freeze point and then reheat it to the proper orientating temperature before proceeding with the blowing operations.

In Step 2, blow mold 15 which comprises half sections, 17a and 17b, is in closed position about mandrel 9 and the parison formed thereon in Step 1. Mold halves 17a and 17b define a cavity for expansion of the parison to the container to be formed. A lip of the parison about mandrel 9 is held thereto by portions of mold halves 17a and 17b fitting tightly about the lower end of mandrel 9.

In Step 3, the parison is in full contact with the cavity of mold 15 forming the container 19. It is seen that the container completely encloses the mandrel with plastic formed across the normal opening of the container around the mandrel. The preformed parison is expanded from mandrel 9 in blow mold 15 by any suitable method, such as introducing a fluid thereto under pressure through conduit 11 of mandrel 9. Although conduit 11 is shown as a single conduit, it is to be understood that a plurality of outlets for the fluid can be positioned in mandrel 9.

In Step 4, mold halves 17a and 17b are shown provided with electrical resistant wires 21a and 21b, respectively, or the like surrounded on three sides by insulation materials 23a and 23b, such as asbestos, with the remaining side in contact with the plastic material in the mold cavity. Resistance wires 21a and 21b are connected to an electrical source, not shown, by positive and negative leads shown. When mold halves 17a and 17b are closed, wires 21a and 21b make contact forming a circuit. Heat from the resistance wires causes the oriented plastic material to separate thus providing an opening in the container by removing the material formed thereover around the mandrel.

Mold halves 7a and 7b and 17a and 17b are movable together and apart by means, not shown, such as air cylinders, hydraulic cylinders and the like which are well known in the art for such purposes. Mandrel 9 is movable between molds 5 and 15 in any conventional manner, such as through vertical movement, horizontal movement, or circular movement depending upon the arrangement of the molds. The molds 5 and 15 can be stationary in vertical or horizontal alignment or may be movable in a circular fashion and intermittently close about the mandrel.

The apparatus and method of my invention can be employed in the fabrication of articles from any thermoplastic polymer which is normally extruded, thermoformed or blow molded, but the invention is of particular advantage with those crystalline polymers which can be oriented on stretching at carefully controlled temperatures, preferably just below the crystalline melting point of the polymer. Polymers such as polystyrene, polyvinylchloride, nylons and various cellulose derivatives can be fabricated with the method and apparatus of my invention, but I prefer to work with the normally solid polymers of mono-1-olefins containing up to 8 carbon atoms, and particularly those polymers which have relatively high degrees of crystallinity, for example the high density ethylene polymers and isotactic polypropylene, poly-4-methylpentene-1, polybutene and the like.

It will be noted that the essential feature of this invention is that the parison preformed has a configuration similar to that of the final article to be formed. In this method of forming the parison with equal wall thickness throughout the resulting hollow article will be of uniform wall thickness. Although no restrictions are necessary for forming the parison into configuration like the final article, preferably the parison is formed by injection molding molten plastic material into a cavity about a mandrel having the desired configuration. In this method the mandrel can have any desired configuration such as circular, cylindrical, rectangular, oval and the like depending upon the configuration of the article to be formed. Furthermore, it will be noted that the article formed will have a neck opening portion of diameter as great as that of the mandrel, if one is used in forming the parison.

Complete orientation of the hollow article is accomplished by this invention because every portion of the hollow article is expanded in the final forming operation. In this regard the neck portion of the container is oriented to the same degree as any other part of the container. In the past, the neck portion of containers has been formed without any orientation of the material because the neck portions have been formed by compression between the mandrel and mold neck. Generally, the parison will be expanded in a ratio of about 2:1 to about 10:1 to obtain the desired orientation. Preferably, expansion will be in the range of about 3:1 to 6:1. If the hollow article is to contain threads at the neck portion these will be formed by the final blowing operation. If the hollow article is to have a threaded neck portion it will be of limited configuration (round) whereas if a snap-on attachment is to be employed the neck portion can have any configuration. Thus, the neck and body portions of the hollow articles can have the same cross section throughout such as rectangular or triangular.

Reasonable variations and modifications of this invention will be apparent to one skilled in the art which will come within the scope of this disclosure and claims.

I claim:

1. The method for forming an oriented plastic container which comprises: injecting molten thermoplastic material about a mandrel in an injection mold zone to form a parison of uniform wall thickness having a configuration substantially the same as but smaller in size than that of the container;

removing said parison and mandrel from said injection zone and enclosing same in a blow mold zone;

expanding said parison from said mandrel in said blow mold zone to form an oriented container, the entire container being formed by the expansion, with a resultant oriented film being formed around said mandrel and across the normal opening of said container by said expansion; and heating said resulting film along a line around the normal opening of said container to thereby cause said film to separate from the container opening.

2. The method for forming an oriented plastic container which comprises: injecting molten thermoplastic material about a mandrel in an injection mold zone to form a parison of uniform wall thickness having a configuration substantially the same as but smaller in size than that of the container;

removing said parison and mandrel from said injection zone; cooling said parison about said mandrel until said material is in a crystalline condition;

reheating said parison to a temperature near but below the crystalline melting point of said material;

enclosing said reheated parison about said mandrel in a blow mold zone;

uniformly expanding said parison from said mandrel in said blow mold zone to form an oriented container, the entire container being formed by the expansion, with a resultant oriented film being formed around said mandrel and across the normal opening of said container by said expansion; and heating said oriented film along a line around the normal opening of said oriented container to thereby cause said oriented film to separate from the container opening.

References Cited

UNITED STATES PATENTS

| 2,317,763 | 4/1943 | Hall. |
| 2,715,751 | 8/1955 | Weber _____ 264—97 |
| 2,878,513 | 3/1959 | Slaughter. |
| 2,980,963 | 4/1961 | Makowski _____ 264—235 |
| 3,012,286 | 12/1961 | Gasmire. |
| 3,108,850 | 10/1963 | Brant _____ 264—97 |
| 3,170,970 | 2/1965 | Adams _____ 264—97 X |
| 3,172,929 | 3/1965 | Santelli _____ 264—97 |
| 3,184,524 | 5/1965 | Whiteford _____ 264—97 |
| 3,229,007 | 1/1966 | Waechter _____ 264—99 |

FOREIGN PATENTS

| 36,978 | 3/1963 | Switzerland. |
| 666,206 | 7/1963 | Canada. |

ROBERT F. WHITE, *Primary Examiner.*

R. B. MOFFITT, *Assistant Examiner.*